US007301740B2

(12) United States Patent
Katoda

(10) Patent No.: US 7,301,740 B2
(45) Date of Patent: Nov. 27, 2007

(54) SURGE PROTECTOR DEVICE AND ITS FABRICATION METHOD

(76) Inventor: Takashi Katoda, 4804-83, Ikku, Kochi-shi, Kochi (JP) 780-8130

( * ) Notice: Subject to any disclaimer, the term of this patent is extended or adjusted under 35 U.S.C. 154(b) by 233 days.

(21) Appl. No.: 11/053,893

(22) Filed: Feb. 10, 2005

(65) Prior Publication Data

US 2005/0180081 A1 Aug. 18, 2005

(30) Foreign Application Priority Data

Feb. 16, 2004 (JP) ............................ 2004-037823

(51) Int. Cl.
*H02H 9/00* (2006.01)

(52) U.S. Cl. ........................................................ 361/56

(58) Field of Classification Search ................ 361/118, 361/56, 111

See application file for complete search history.

(56) References Cited

U.S. PATENT DOCUMENTS

| | | | | |
|---|---|---|---|---|
| 6,697,242 | B2 * | 2/2004 | Katoda | 361/91.2 |
| 7,106,571 | B2 * | 9/2006 | Katoda | 361/111 |
| 2001/0026432 | A1 * | 10/2001 | Katoda | 361/117 |
| 2002/0024790 | A1 * | 2/2002 | Katoda | 361/117 |
| 2004/0141277 | A1 * | 7/2004 | Katoda | 361/118 |
| 2005/0180081 | A1 * | 8/2005 | Katoda | 361/118 |

FOREIGN PATENT DOCUMENTS

| | | |
|---|---|---|
| EP | 1 139 528 | 10/2001 |
| JP | 03-250575 | 11/1991 |

OTHER PUBLICATIONS

European Search Report dated May 25, 2005 for EP 05003048.5.

* cited by examiner

*Primary Examiner*—Michael Sherry
*Assistant Examiner*—Boris Benenson
(74) *Attorney, Agent, or Firm*—Eric J. Robinson; Robinson Intellectual Property Law Office, P.C.

(57) ABSTRACT

The present invention is to provide an improved surge protector device. The present invention's surge protector device basically has a plurality of metal bars which are combined to a single body by a continuous high-resistive film of semiconductor crystal so that there is no gap between adjacent metal bars; and electrodes formed on the endmembers of the said metal bars composing the single body. Thus, the present invention's surge protector device is fabricated so as to have no air gap between adjacent ones of the metal bars. As a result, the present invention's protector device can operate in such a way that the surge protector device changes from a non-conductive state to a conductive state due to breakdown in depletion region accompanying the semiconductor crystal when the voltage across the electrodes exceeds a threshold voltage because of a surge.

3 Claims, 4 Drawing Sheets

PRIOR ART

SURGE PROTECTOR DEVICE AND ITS FABRICATION METHOD

BACKGROUND OF THE INVENTION

1. Field of the Invention

The present invention relates to a surge protector device and its fabrication method which returns itself to its non-conductive state in a very short time after conversion to its conductive state by a surge including thunder.

2. Related Background Art

A surge protector device including an arrester is very important device to protect various electronic apparatuses from a surge including thunder. The surge protector device is a general name of apparatuses which are used in order to protect other electronic apparatuses from excess voltage, that is, a surge. An arrester is used to protect other electronic apparatuses from thunder, that is extremely high voltage and large current. The arrester is one of the surge protector apparatuses. The term of "protector device" is used here to indicate apparatuses which are used in order to protect other electronic apparatuses from excess voltage or excess current. However, the excess voltage is not limited to only extremely high voltage such as thunder but includes low voltage if it is excess to a specified voltage.

A glass-tube type arrester has been conventionaly used. It contains special gas between two electrodes in a glass tube. It is non-conductive unless surge is induced. When surge or thunder is induced, discharge starts and the gas between the electrodes changes to conductive. Current passes through the arrester, and it is led to the earth. Discharge does not stop immediately after surge ceases. The arrester cannot protect other electronic apparatuses from continuous current or next attack by surge or thunder. There were serious problems in a glass-tube and other type protector devices which have been used. One of the problems is that a protector device must change from its resistive state to a conductive state in a very short time such as 0.03 μsec. when it is attacked by surge. Another problem is that a protector device should return from the conductive state to the original resistive state when surge ceases.

In order to solve these problems in the prior art, an improved arrester was proposed (Japanese Patent Publication No. 118361/1995, "Molybdenum Arrester" by Seita Ohmori). It is what uses a plurality of molybdenum bars whose surface was oxidized. This arrester will be called here as a "molybdenum arrester".

The molybdenum arrester leads current to the earth when surge or thunder is induced. The molybdenum arrester is very useful and economically efficient because it repeats the change between the conductive and non-conductive states automatically.

It is possible to use metals other than molybdenum in the protector device which functions with the same principle as the molybdenum arrester. Tantalum, chromium and aluminum are included in such metals.

There is a serious problem in the improved protector device by Ohmori which results from the fact that the protector device uses a simple pileup of a plurality of bars which have resistive films on their surfaces. FIG. 1 shows schematically the arrester (10) of the prior art which is called the molybdenum arrestor proposed by Ohmori (Japanese Patent Publication No. 118361/1995 "Molybdenum Arrester").

The arrester (10) includes two molybdenum bars (11) which have high resistive oxide films (12) on their surfaces and electrodes (13). The arrestor (10) uses the breakdown phenomenon at the interface between the high resistive films (12). A breakdown voltage depends largely on microscopic structure of the interface. That is, as shown in FIG. 2, the high resistive films (12) on the two molybdenum bars come in contact with each other point by point microscopically although they seem to contact line by line or surface by surface macroscopically.

There exists a layer (21) of air with a thickness of at least several atomic sizes between the high resistive films on the two molybdenum bars. The breakdown is what occurs in this layer of air. Therefore, an oscillator of voltage is observed as shown in FIG. 4 with an oscilloscope when an direct voltage is applied to the arrestor as shown in FIG. 1 which was proposed by Ohmori through an circuit (30) shown in FIG. 3. In FIG. 3, the circuit (30) includes a power source (31), a sample (32), resistors (33, 34), an oscilloscope (35), and an amperameter (36). Similarly, a very sharp pulse of current is observed when an alternating voltage is applied to the Ohmori's arrestor. These phenomena mean that the Ohmori's arrestor cannot be used in practical uses. There has been no report of test on Ohmori's arrestor as described above by Ohmori and other peoples. The fact described above mean that it is impossible to realize a practically useful arrestor as far as it is composed of molybdenum bars simply piled up. In other words, it is impossible to realize a practically useful surge protector device as long as it uses breakdown phenomena in a layer of air between two surfaces.

It is desirable, therefore, to provide a surge protector device which does not use breakdown phenomena in a layer of air between two surfaces.

SUMMARY OF THE INVENTION

In one aspect, the present invention provides a novel and unique surge protector device. This surge protector device basically comprises: a plurality of metal bars which are combined to a single body by a continuous high-resistive film of semiconductor crystal so that there is no gap between adjacent metal bars; and electrodes formed on the endmembers of said metal bars composing the single body. Thus, the present invention's surge protector device is fabricated so as to have no air gap between adjacent ones of the metal bars. As a result, the present invention's protector device can operate in such a way that the surge protector device changes from a non-conductive state to a conductive state due to breakdown in depletion region accompanying the semiconductor crystal when the voltage across the electrodes exceeds a threshold voltage because of a surge. The operational principle of the present invention is fundamentally different from that of the prior art surge protector device as proposed by Ohmori in which the protector device operates to change from a non-conductive state to a conductive sate based on discharge in air gap between plural bars.

In the surge protector device of the present invention, preferably, molybdenum is used as the main component of the metal bar. But, it is also possible to use tantalum, chromium or aluminum as the main component of the metal bar.

According to another aspect of the present invention, there is provided a novel and unique method for fabricating the surge protector device (as stated above). This novel and unique fabrication method of the present invention basically comprises two specific processing steps (that is, first and second oxidization steps). At the first oxidization step, a plurality of metal bars are oxidized so that adjacent ones of the metal bars are combined with each other. At the first oxidation step, the plurality of metal bars first set in contact, and then these metal bars are made to a single body without any gap between adjacent bars. At the second oxidization step, the single body composed of the plurality of metal bars are oxidized again in order to form a high-resistive semiconductor film on the whole surface of the single body. And, at a final step, electrodes are formed on the end metal bars on the opposite sides of the single body. The number of the metal bars in the single body is properly selected in accordance with the use of the surge protector device. Usually, the number of the metal bars is 2-4. In some applications, it is also possible to use a plurality of single bodies connected electrically in series.

As stated above, a preferred metal for the metal bar is molybdenum although other metals such as tantalum, chromium and aluminum can be used. In case that the molybdenum bars are used in the surge protector device, after once the device changes to the conductive state due to the surge, it returns quickly from the conductive state to the original no-conductive state at the moment the surge (or thunder) ceases. This is caused even when the molybdenum oxide film is broken by a large current because molybdenum is oxidized quickly if it is in oxidizing atmosphere. Thus, the surge protector device operates to automatically repeat the transition between two states (i.e., the non-conductive state and conductive state) in case that molybdenum is used. In addition, a transitional voltage (a threshold voltage) at which the surge protector device changes from the non-conductive state to the conductive state can be controlled precisely for the novel surge protector device according to the present invention.

DETAILED DESCRIPTION OF THE PREFERRED EMBODIMENTS

Preferable embodiments of the present invention will be explained in detail with reference to the attached drawings, hereinafter.

In the following embodiments, cylindical molybdenum bars were used.

In the first embodiment, four molybdenum bars whose diameter was 2 mm and length was 7 mm were used to make a main element of the protector device.

At the first step, molybdenum bars were rinsed with aceton and then with methyl alcohol. After then, they were rinsed with a high-purity water and then dried.

Figure 1:
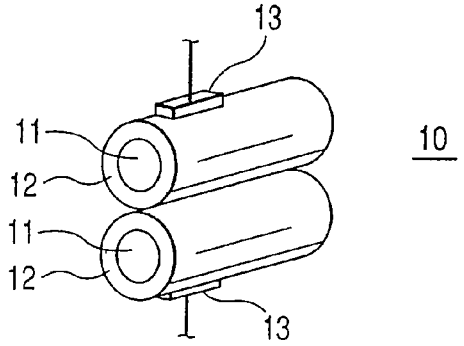
FIG. 1 is a schematic view of a prior art surge protector device which includes two cylindrical molybdenum bars with high resistive films which were formed by oxidizing each bar separately prior pile up.
Figure 2:
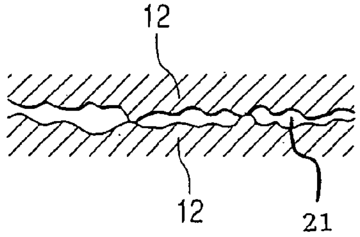
PRIOR ART FIG. 2
FIG. 2 is a schematic view of the interface between the two molybdenum bars with oxide films on their surface.
Figure 3:
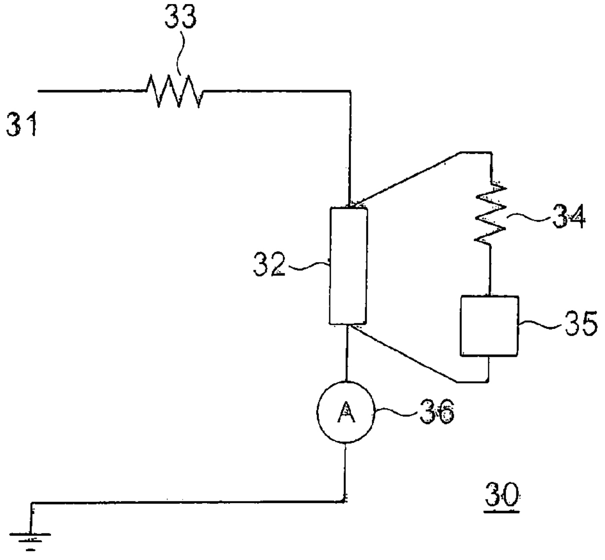
PRIOR ART FIG. 3
FIG. 3 shows schematically a circuit which was used to test the prior art surge protector device.
Figure 4:
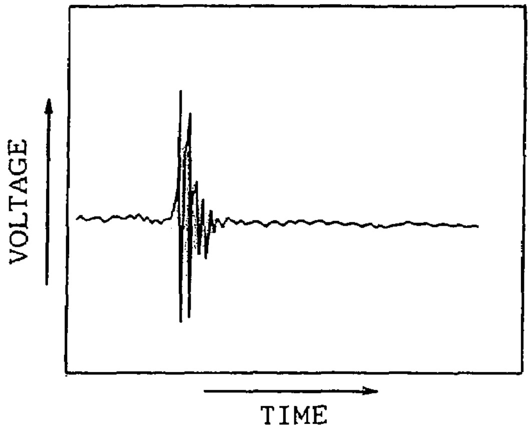
FIG. 4 shows current oscillation observed when a direct voltage is applied to the prior art surge protector device.
Figure 5:
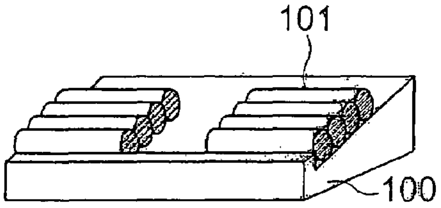
PRIOR ART FIG. 5
FIG. 5 is a schematic view of plural metal bars and a holder which is used to oxidize the bars keeping them in contact.

At the second step, the four molybdenum bars were oxidized to make the bars into a single body. The molybdenum bars (101) were set on a holder (100) as shown in FIG. 5. The top surface of the holder (100) has a tilt so that the molybdenum bars (101) are set in contact. It is preferred that the holder is made of high-purity quarts. The holder with the molybdenum bars on its top surface was set in an equipment for oxidization. In FIG. 5 the holder (100) is shown to have two sets of the molybdenum bars (101) on its top surface. However it is easily understood that the holder (100) can be designed to have more sets. The first oxidization to make the four molybdenum bars into a single body was done, in this embodiments, by heating the bars at 650° C. for 30 min, in an atmosphere of high-purity oxygen. However, it is preferred one example and it can be changed an accordance with particular uses. The atmosphere can also be changed. For example, high-purity oxygen including high-purity steam can be used.

While the first oxidization was done to make the four molybdenum bars into a single body, a thin high-resistive film was formed on the whole surface of the body composed of bars.

At the third step, the second oxidization is done to cause the thin high-resistive film on the whole surface of the body to be more thick. In this embodiment, oxidation was done at 550° C. for 5.5 hours. The conditions should be changed according to particular uses. The body was kept in the oxidizing equipment while the first oxidization and second oxidization were being done. The atmosphere in the equipment was changed from oxygen to high-purity nitrogen after the first oxidization until a temperature in the equipment reaches to 550° C. The second oxidization was done also in high-purity oxygen.

Figure 6:
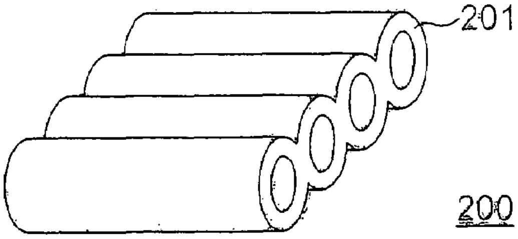
FIG. 6 is a schematic view of the main element of the surge protector device which was formed by oxidizing plural metal bars keeping them in contact.

FIG. 6 shows schematically the main element (200), that is, the body composed of the four molybdenum bars (101) after the completion of the second oxidization. In FIG. 6, a high-resistive film (201) is formed on the whole surface and areas at the interfaces between the molybdenum bars. The film (201) is made of molybdenum oxide and continuous on the whole surface and at the interfaces. That is, there is no gap between the molybdenum bars and in the film. While a thickness of the film formed by oxidization at 550° C. for 5.5 hours is actually about 20 μm, the thickness is exaggerated in FIG. 6 for convenience clear.

Figure 7:
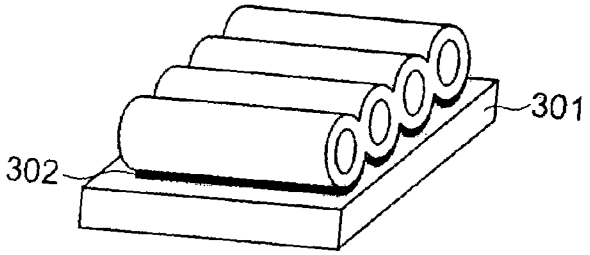
FIG. 7 is a schematic view of the plate on which the main element is fixed.

At the fourth step, the main element (200) composed of four molybdenum bars was fixed on a plate (301) with paste (302) as shown in FIG. 7 in order to make mechanically stable the main element. The plate (301) may be made of any material which is electrically resistive and heat-resisting. The paste (302) may be also made of any material which is electrically resistive. It is preferred to use a paste which does not shrink when it becomes hard. It is also preferred that only the bottom region of the main element (200) is fixed with the paste in order that the paste (302) does not hinder the formation of electrodes in the next step and that an oxidizing agent contacts the main element at many areas as much as possible when the main element and the oxidizing agent are set in a case.

Figure 8:
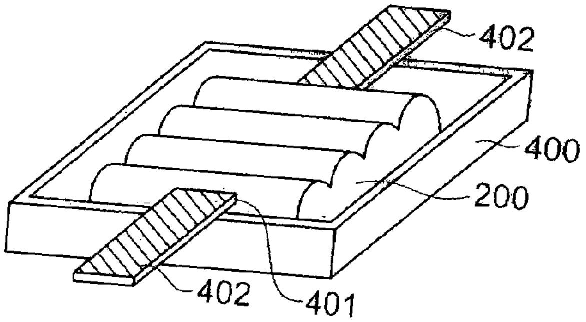
FIG. 8 is schematic view of the structure formed by setting the plate with the main element in the case and forming electrodes and electrode terminals to the main element.

At the fifth step, the plate (301) on which the main element (200) had been fixed was bonded in the case (400) as shown in FIG. 8. Then electrodes (401) were formed on the two end members of the molybdenum bars consisting the main element (200). The electrodes (401) were stuck on the end members with indium solder. These electrodes may be stuck with other materials such as electrically conductive paste. However it is preferred that no process at a high temperature is required to form the electrodes (401). In this embodiment, the electrodes (401) were formed by sticking two electrode terminals (402) with indium solder to the most central parts of the molybdenum bars. The electrode terminals were made of thin plates of brass. The electrode terminals (402) had a length such that they extend to outside of the case (400) and they are connected electrically to means outside of the case (400). The electrode terminals (402) may be made of other electrically conductive material such as capper. The case (400) was made of heat-resisting plastics in this embodiment. However it may be made of other materials such as ceramics as far as they are electrically insulating and hear-resisting.

Figure 9:
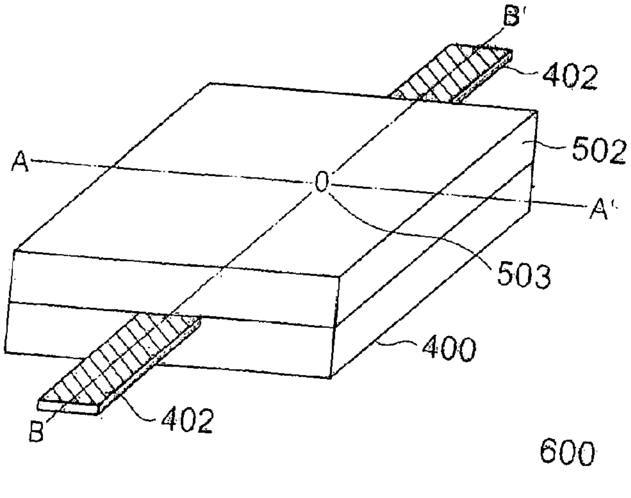
FIG. 9 is a schematic view of the structure after setting a cap on the case.
Figure 10A:
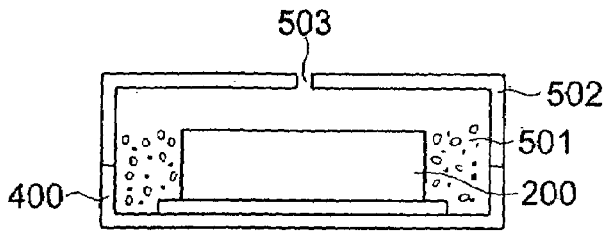
FIG. 10 is a schematic cross-sectional view of the surge protector device according to the first embodiment of the present invention after setting the main element, oxidizing and fire-resisting agents in the case.
Figure 10B:
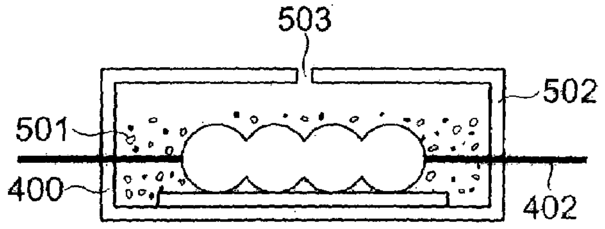

At the sixth step, a mixture (501) composed of an oxidizing agent and a fire-resisting agent was inserted into the case (400) in which the main element (200) had been fixed and a cap (502) of the case (400) was fixed with paste as shown in FIG. 9. Then the case (400) was set in a vacuum vessel and inside of the case was evacuated through a hole (503) formed in the cap (502). Paste was arranged around the hole (503). After a pressure inside of the case (400) reached $10^{-3}$ Torr, the case (400) was sealed by heating the paste (504) to melt it and close the hole. By sealing the case, the surge protector device (600) according to the first embodiment of the present invention was completed. Cross sectional view of the completed surge protector device (600) are shown schematically in FIGS. 10(*a*) and 10(*b*). The cross sectional view shown in FIG. 10(*a*) is what obtained along the line A-A' in FIG. 9 and that shown in FIG. 10(*b*) is along the line B-B'.

The completed surge protector device (600) changed from a non-conducive state to a conductive state by application of an inpulse of 4000V. This means that the surge protector device (600) satisfactorily serves as a surge protector device.

When the mixture (501) obtained by mixing potassium chlorate as an oxidizing agent and silica as a fire-resisting agent of a ratio 1:3 in weight was inserted in the case (400) with the main element (200), the surge protector device (600) was reproduced even when an inpulse of 4500V was applied and a current of 300 A flowed.

Although the high-resistive film on the molybdenum bars was made of semiconductor crystal formed by oxidization of molybdenum, it may be semiconductor crystal made by other methods such as vapor growth, suputtering and vacuum evaporation.

Figure 11:
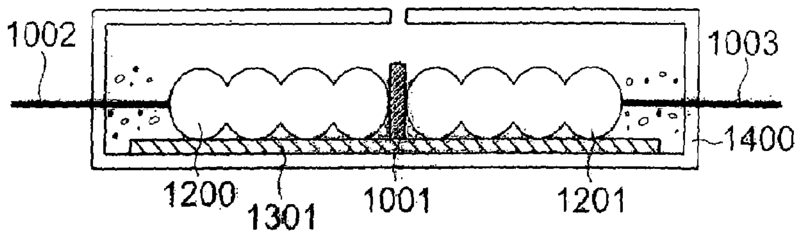
FIG. 11 is a schematic view of the surge protector device according to the second embodiment of the present invention.

FIG. 11 shows schematically the surge protector device (1000) according to the second embodiment of the present invention. In this embodiment, two main elements (1200, 1201) are electrically connected with each other. Each element was the same as the main element in the first embodiment and it was composed of four molybdenum bars. A connecting electrode (1001) was arranged between the two main elements (1200, 1201) in order to connect the elements electrically in series. On the opposite side of the first main element (1200) to the connecting electrode (1001) there was formed an electrode terminal (1002) which extended to outside of the case (1400). The electrode terminal (1002) was formed by the method as explained above concerning to the first embodiment. On the opposite side of the second main element (1201) to the connecting electrode (1001) there was formed an electrode terminal (1003) which extended to outside of the case (1400). The two main elements (1200, 1201) and the connecting electrode (1001) were connected with each other using electrically conductive paste. The main elements (1200, 1201) were fixed by the same method as that described above concerning to the first embodiment. An oxidizing agent and a fire-resisting agent were inserted into the case (1400) similar to the first embodiment. The case (1400) was sealed by the same method as that shown above concerning to the first embodiment.

The surge protector device (1000) according to the second embodiment changed from a non-conductive state to a conductive state by application of an inpulse of 8000V and its function took place even when an inpulse of 9000V was applied and a current of 600 A flowed.

The surge protector apparatuses according to the first and second embodiments of the present invention did not show the oscillation of voltage a current when a direct voltage was applied which the molybdenum arrestor proposed by Ohmori showed. This fact means that there is no air gap in any part of current path for the surge protector device according to the present invention.

The surge protector apparatuses according to the first and second embodiments had error in characteristics within ±2% when they were fabricated with the same conditions for each case. On the other hand, the characteristics of the arrestor proposed by Ohmori which were fabricated practically with the same conditions had non-uniformity as large as ±20%. One of the reason is that an interface structure between the molybdenum bars cannot been controlled in atomic size because the arrestor by Ohmori has a structure in which plural molybdenum bars are simply piled up. Another reason is that the force applied to the interface between the molybdenum bars are not controlled because the molybdenum bars are simply piled up, too. Both atomic structure of the interface and force applied to the interface had effects on the electrical characteristics including breakdown. The surge protector devices according to the present invention did not cause problems such as current oscillation and non-uniformity of characteristics because they had no gap in the current path.

Principle of the function, which the protector apparatuses according to the present invention have, is considered as follows. The switching function from a non-conductive state to a conductive state occurs because breakdown occurs in depletion region accompanying to semiconductor crystal in the molybdenum oxide film on the surface of the molybdenum bars and in the areas between the bars when electric field above a threshold is induced. On the other hand, the arrestor proposed by Ohmori changes its state from a non-conductive to a conductive because discharge occurs in the air gap between the molybdenum bars when electric field reaches at a threshold. Therefore, it is described clearly in the patent application by Ohmori that the switching function is based on discharge. Discharge is not used to have the switching function in the case of the surge protector device according to the present invention. That is, the principle of the switching function of the surge protector device according to the present invention is fundamentally different from that accompanying to the Ohmori's arrestor.

It is possible that a part of the current path is broken because of heat if an applied voltage is large and a current flow is large when the protector device changes its sate from a non-conductive one to a conductive one. In such a case, the protector device according to the present invention is restored quickly because the molybdenum is oxidized quickly if it is in an oxidizing ambient. It is similar to the arrestor proposed by Ohmori.

The surge protector device according to the present invention has not the following problems which the arrestor proposed by Ohmori has:

1) poor characteristics such as current oscillation
2) poor controlability, and
3) poor resproducibility of production.

The principle of switching function from a non-conductive state to a conductive one of the surge protector device according to the present invention is based on breakdown in depletion region accompanying to semiconductor crystal. It is completely different from that the arrestor proposed by Ohmori is based on, that is, discharge of air.

What is claimed is:

1. A surge protector device used to protect electronic apparatuses from surge voltage, said surge protector device comprising:

a plurality of metal bars which are combined to a single body by a continuous single high-resistive film of semiconductor crystal which was formed by oxidizing said plurality of metal bars keeping in contact with each other so that there is no gap between adjacent metal bars, said continuous single high-resistive film covering the whole surface of said plurality of metal bars; and electrodes formed on the endmembers of said metal bars composing said single body, wherein said surge protector device changes from a non-conductive state to a conductive state due to breakdown in depletion region accompanying said semiconductor crystal when a voltage across said electrodes exceeds a threshold voltage because of a surge.

2. The surge protector device according to claim 1, wherein the main component of said metal bar is molybdenum.

3. The surge protector device according to claim 1, wherein the main component of said metal bar is tantalum, chromium or aluminum.

* * * * *